United States Patent [19]
Grenet

[11] 3,906,691
[45] Sept. 23, 1975

[54] AIRPLANE HANGAR

[75] Inventor: Jean-Jacques Grenet, Vigneux, France

[73] Assignee: Union de Transports Aeriens, Paris, France

[22] Filed: Oct. 10, 1973

[21] Appl. No.: 405,123

[30] Foreign Application Priority Data
Oct. 19, 1973 France .............................. 73.37123

[52] U.S. Cl. ............................ 52/237; 52/169 DT
[51] Int. Cl.² ........................................... E04H 6/44
[58] Field of Search ......... 52/33, 234, 79, 174, 237, 52/169 DT

[56] References Cited
UNITED STATES PATENTS

| | | |
|---|---|---|
| 1,837,152 | 12/1931 | Ellsworth ........................ 52/237 X |
| 2,574,307 | 11/1951 | Whelan ................................ 52/234 |
| 3,346,997 | 10/1967 | Parrish ............................ 52/237 X |
| 3,417,526 | 12/1968 | Lawson .......................... 52/169 DT |
| 3,543,455 | 12/1970 | Walsh ............................. 52/237 X |
| 3,543,461 | 12/1970 | Davidson ............................. 52/237 |

Primary Examiner—Price C. Faw, Jr.
Attorney, Agent, or Firm—Stevens, Davis, Miller & Mosher

[57] ABSTRACT

A modular construction aircraft hangar comprising a plurality of modules consisting of adjacent quadrilateral portions each with an extension portion, preferably triangular, when viewed in plan. The quadrilaterals of any adjacent two modules have a common side and another module has its extension portion inserted between those of the two modules.

7 Claims, 4 Drawing Figures

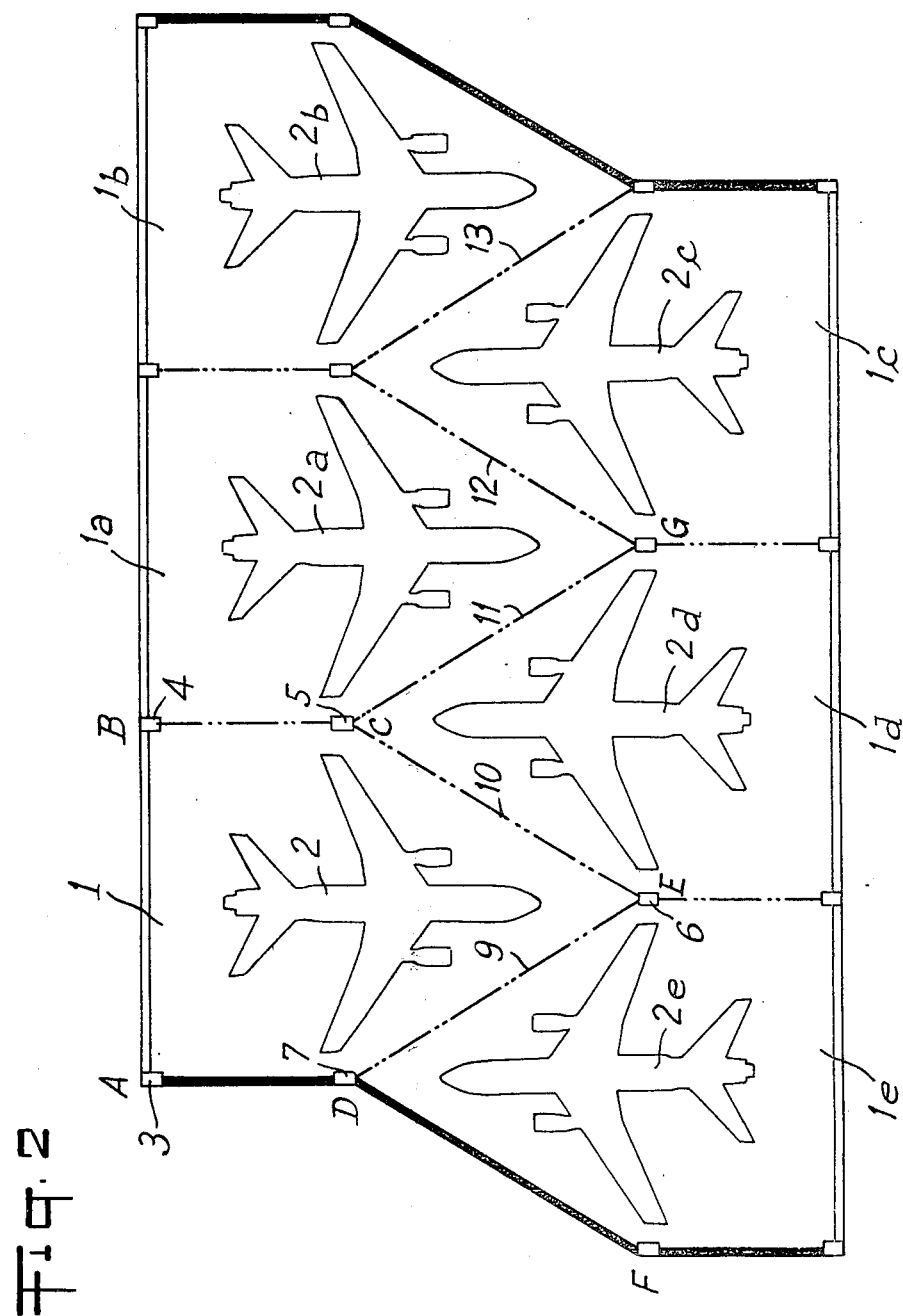

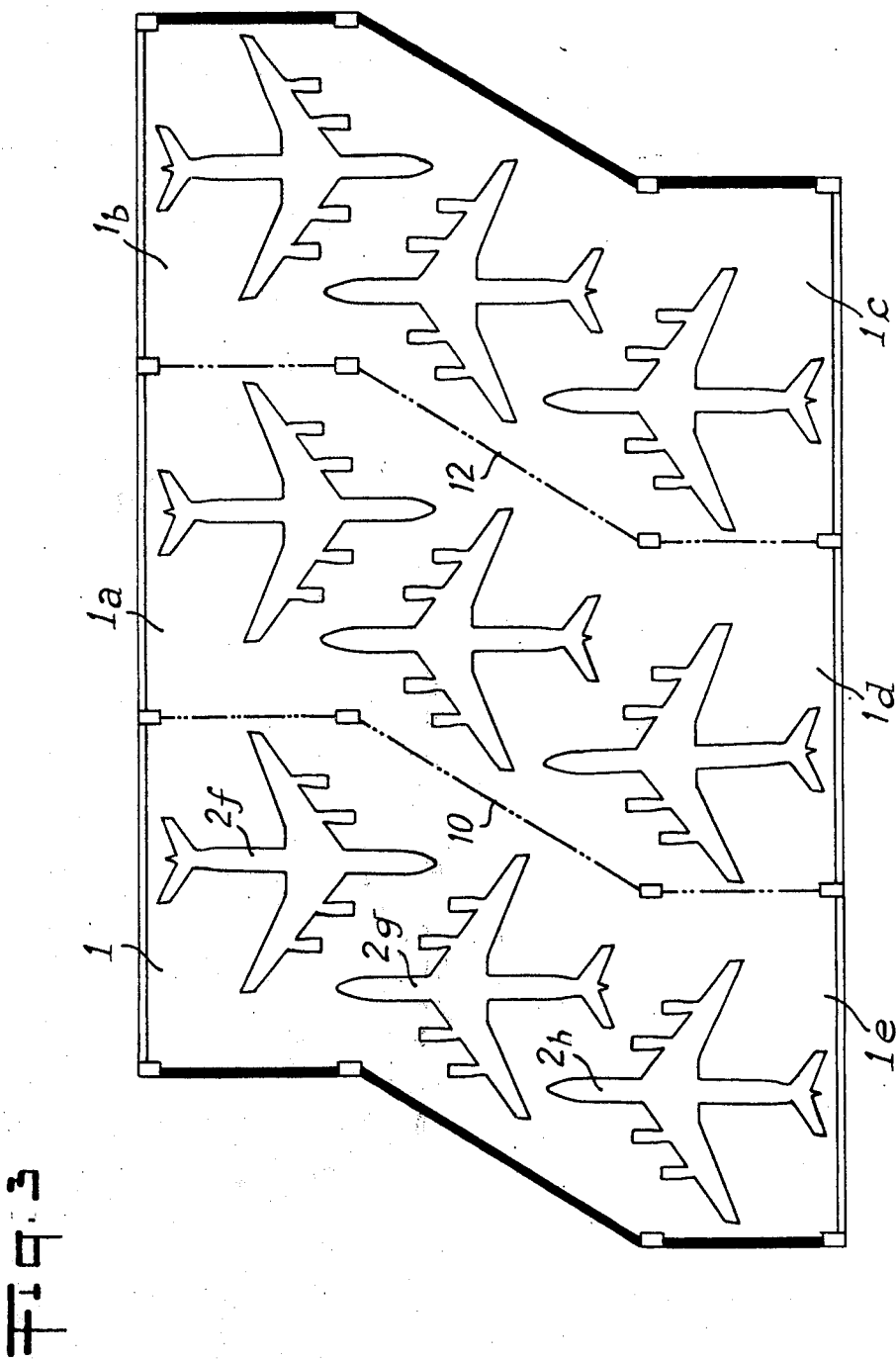

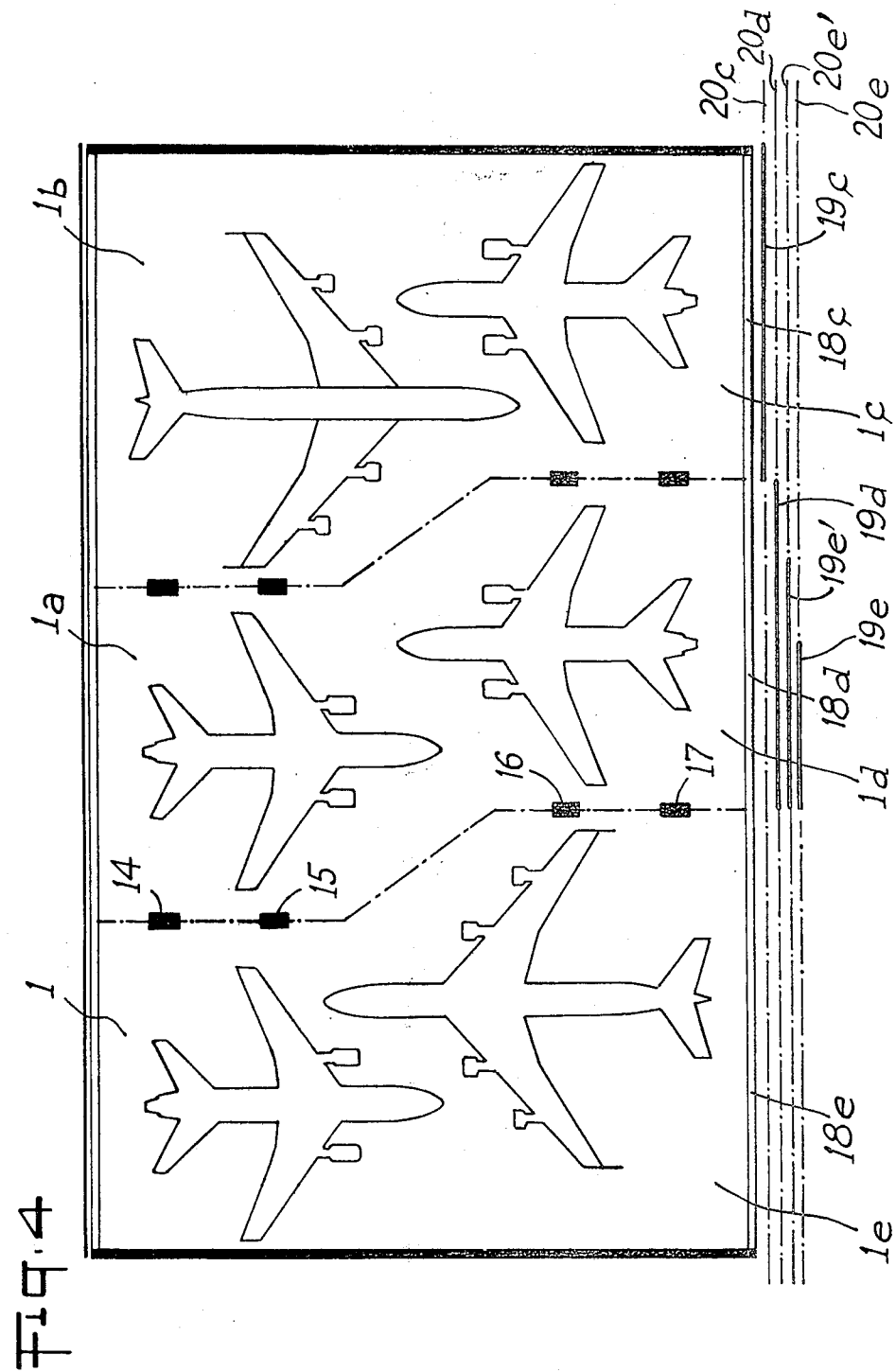

AIRPLANE HANGAR

The present invention relates to a unit construction hangar for aeroplanes. The construction of hangars for aeroplanes presents numerous problems because of the increasing sizes of new aircraft types, and this leads to the need for hangars which are also very large and cover a large area of ground with a superstructure having girders with a large span. Apart from the technical problems which they pose, these constructions are costly.

It has been found that aeroplanes being serviced or housed in a hangar occupy a number of zones of greater or lesser size which can be located at random within movable limits defined by the external walls of the hangar, and these zones can be separated into servicing bays using interior partitions of the hangar.

By knowing the minimum surface area required for servicing a given aeroplane, it is possible to assemble the servicing areas of a hangar to the best advantage in order to facilitate the work of the personnel and to achieve the maximum reduction in wastage of space.

According to the present invention, there is provided an aeroplane hangar comprising at least one module for enclosing at least one aeroplane and having a plan view corresponding to a quadrilateral extended by a part whose shape can be inserted so as to overlap between the corresponding parts of two other adjacent similar modules. This hangar of unit or modular construction offers the same advantages of polyfunctionality as known expensive hangars having a large span.

This arrangement makes it possible to utilize a minimum ground area inscribed within a simple geometric contour, and allows the operations of aeroplane maintenance, repair and inspection to be carried out easily. These modules can be assembled together to form a multi-aircraft hangar the construction cost of which is reduced to a minimum and the layout of which allows the construction personnel to position the ground engaging supports of the framework to extend vertically at the perimeter of each module. The geometric shape of the module makes it possible finally to control the difficult and costly technical problems of large span frameworks.

In effect, the maximum span is equal to the entrance opening of each aeroplane module and corresponds to the wing span of the aeroplane to be accommodated, taking into account clearance for movement round the wing tips. This type of hangar makes it possible to employ for each module a building of conventional construction comprising an ordinary framework which can be produced and erected quickly.

In order to make it easier to introduce working platforms or scaffolds and to increase the safety and comfort of the personnel responsible for inspecting the aeroplanes, it is possible to replace those walls which will form partitions between adjacent modules by judiciously distributed pillars. The size of the hangar can be increased some time after initial erection depending on the needs of the user and it is possible to add to the hangar one or more modules without considerable work being required. With this aim, the end modules of the first construction phases are optionally provided with starting points or connectors which make it possible easily to construct future extensions.

Contrary to the known devices this arrangement makes it possible to employ doors consisting of rectilinear panels which can be shifted especially by rolling them opposite the openings of the other adjacent units, in order to free the opening of at least one unit.

In order that the present invention may more readily be understood, the following description is given merely by way of example with reference to the accompanying drawings in which:

FIG. 2 is a plan view of a similar embodiment of hangar;

FIG. 3 is a plan view of another embodiment; and

FIG. 4 is a plan view of an assembly of hangar modules showing the arrangement of the doors of the hangar.

Figure 1:
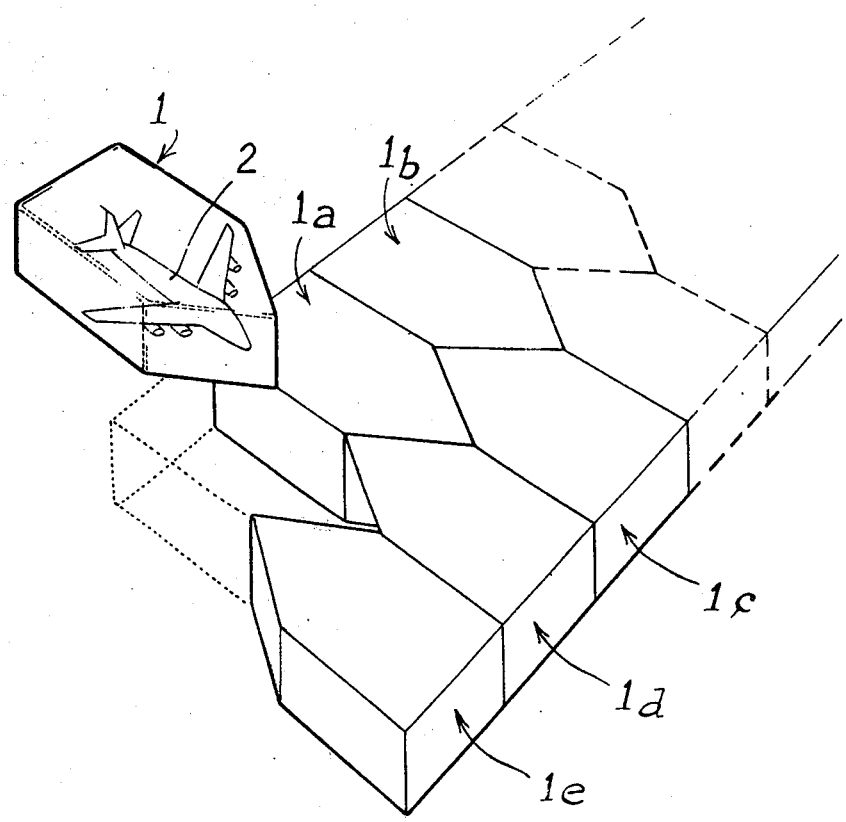
FIG. 1 is a top perspective view of a hangar according to the invention.

FIG. 1 represents an aeroplane hangar of modular construction, comprising a combination of modules 1, 1*a*, 1*b* each intended to accommodate a single aeroplane 2. Each module such as 1, is produced using means known in the building construction art in particular a metal framework assembly and has, when viewed in plan, ground area (FIG. 2), in the form of a quadrilateral A B C D, in this case a rectangle, extended by a triangular part C D E which can be inserted between corresponding triangular parts D F E and C E G of two other similar modules 1*e* and 1*d* situated opposite module 1 and which face module 1.

In the embodiment of FIGS. 1 and 2, the hangar comprises a first row of modules 1, 1*a*, 1*b*, the triangular parts of which such as D C E are inserted so as to overlap into the corresponding triangular parts of the second row of modules 1*c*, 1*d*, 1*e* located opposite.

The quadrilateral A B C D has at side A B an opening which allows entry to and exit from the module by an aeroplane. The ground engaging ends of the corner posts 3, 4, 5, 6, 7 of the framework extend vertically at the perimeter of the module.

Although the embodiment of the hangar represented in FIG. 1 comprises interior partitions 9, 10, 11, 12, 13 which are represented in chain dotted lines in FIG. 2, it is possible, as shown in FIG. 3, to dispense with the partitions 9, 11 and 13, allowing the partitions 10, 12 to remain, so as to connect the modules 1 and 1*e*, 1*a* and 1*d*, 1*b* and 1*c* situated opposite each other in order to form areas which are able to accommodate a plurality of aeroplanes such as the three machines 2*f*, 2*g*, 2*h* within the two modules 1 and 1*e*.

As an extension of this it is also possible to consider the chain dotted lines representing the partitions between adjacent modules as being imaginary lines on which the base support points of the posts 4, 5 and 6 can be located and in this case to dispense altogether with the interior separating partitions.

FIG. 4 represents a hangar of modular construction for aeroplanes, and comprises a combination of modules 1, 1*a*, 1*b*, 1*c*, 1*d*, 1*e* which each have a plan view corresponding to a quadrilateral extended by a triangular part. As in FIG. 3, some of the partitions have been dispensed with and merely the ground engaging members or posts 14, 15, 16 and 17 have been retained.

In this embodiment a removable door assembly 19*c*, 19*d*, 19*e* passes across each opening 18*c*, 18*d*, 18*e* and the door sections can be shifted on tracks to come opposite the openings of the adjacent units.

In FIG. 4, the door section 19*e* which comprises two separate components 19*e* and 19*e'* is shifted opposite the door 19*d* in order to free the opening 18*e*.

These doors consist of rectilinear panels mounted in a known manner on rolling tracks 20c, 20d, 20e and 20e' which extend over the entire length of the hangar, in order to allow opening of two module entrances at a time such as 18e and 18d and to allow the doors 19e and 19d to be brought opposite the door 19c.

Starting from this modular arrangement, it is possible to effect a large number of arrangements of hangars.

The embodiments described above are purely by way of non-limiting examples and various modifications can of course be introduced by those skilled in the art without departing from the scope of the invention as defined in the following claims.

I claim:

1. An airplane hangar comprising a plurality of construction modules which enclose airplanes, each of said modules having a plan view in the form of a first quadrilateral portion and a second triangular extension portion having a common side with said quadrilateral portion, said extension portion being inserted between the extension portions of two other adjacent similar modules, said hangar including a first row of said modules located side by side, each module connected to the next module by one of the sides of said quadrilateral portion, and a second identical row of said modules located opposite said first row with triangular extension portions of said modules of said second row inserted between the corresponding triangular portions of said modules of said first row to form a hangar of zigzag shape.

2. A hanger as set forth in claim 1, and having removable zigzag-shaped partitions between the rows of modules arranged in such a way that after a partition has been removed, two modules situated opposite each other form an area capable of accommodating several airplanes.

3. A hangar as set forth in claim 2, and including internally of the hangar a plurality of spaced ground engaging portions of each module leaving an otherwise open passage between adjacent modules.

4. A hangar as set forth in claim 1, wherein each of the construction modules comprises a frame having ground-engaging portions extending vertically at the perimeter of the module.

5. A hangar as set forth in claim 1, wherein the quadrilateral portion of each module has an opening and a door mounted for movement past said opening to allow optional closing thereof.

6. A hangar set set forth in claim 1, wherein the rectangular portion of each module has an opening at one side of the rectangle opposite said extension portion, and including door means mounted for movement across said opening, said door means comprising at least one panel of rectilinear form when viewed from above the hangar.

7. A hangar as set forth in claim 6, wherein said door means comprise a plurality of separate panels each rectilinear when viewed from above.

* * * * *